United States Patent
Wu et al.

(10) Patent No.: US 8,156,278 B2
(45) Date of Patent: Apr. 10, 2012

(54) NON-VOLATILE DATA STORAGE SYSTEM AND METHOD THEREOF

(75) Inventors: Guo-Zua Wu, Taichung (TW); Shin-Hui Huang, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 421 days.

(21) Appl. No.: 12/466,381

(22) Filed: May 14, 2009

(65) Prior Publication Data
US 2010/0115187 A1    May 6, 2010

(30) Foreign Application Priority Data
Oct. 31, 2008    (TW) .............................. 97142208 A

(51) Int. Cl.
*G06F 13/00*    (2006.01)
*G06F 9/26*    (2006.01)
*G06F 9/00*    (2006.01)

(52) U.S. Cl. ........ 711/103; 711/104; 711/112; 711/202; 711/E12.001; 711/E12.008; 713/2

(58) Field of Classification Search .................. 711/103, 711/104, 112, 202, E12.001, E12.008; 713/2
See application file for complete search history.

(56) References Cited

U.S. PATENT DOCUMENTS

| | | | |
|---|---|---|---|
| 2002/0083264 A1 | 6/2002 | Coulson | |
| 2007/0025151 A1 | 2/2007 | Lee | |
| 2007/0276994 A1 | 11/2007 | Caulkins et al. | |
| 2007/0276995 A1 | 11/2007 | Caulkins et al. | |
| 2007/0276996 A1 | 11/2007 | Caulkins et al. | |
| 2008/0072030 A1* | 3/2008 | Karpa | 713/2 |
| 2008/0082814 A1* | 4/2008 | Kuo et al. | 713/2 |
| 2008/0147962 A1* | 6/2008 | Diggs et al. | 711/103 |
| 2009/0113196 A1* | 4/2009 | Jan et al. | 713/2 |

* cited by examiner

*Primary Examiner* — Ly D Pham
(74) *Attorney, Agent, or Firm* — Jianq Chyun IP Office

(57) ABSTRACT

A non-volatile data storage system including a first non-volatile storage medium, a second non-volatile storage medium, and a microprocessor is provided. The first non-volatile storage medium includes a popular data address recording area for recording logic addresses of popular data in the first non-volatile storage medium. The microprocessor is coupled to the first non-volatile storage medium and the second non-volatile storage medium. When the non-volatile data storage system boots up, the microprocessor copies the popular data from the first non-volatile storage medium to the second non-volatile storage medium according to the popular data address recording area. The popular data is accessed in the second non-volatile storage medium instead of the first non-volatile storage medium.

22 Claims, 6 Drawing Sheets

NON-VOLATILE DATA STORAGE SYSTEM AND METHOD THEREOF

CROSS-REFERENCE TO RELATED APPLICATION

This application claims the priority benefit of Taiwan application serial no. 97142208, filed on Oct. 31, 2008. The entirety of the above-mentioned patent application is hereby incorporated by reference herein and made a part of specification.

BACKGROUND

1. Technical Field

The present disclosure relates to a non-volatile data storage system and a method thereof.

2. Description of Related Art

Computers have become one of the most indispensable tools in our daily life, and data storage devices for storing different information play a very important role in these computers.

Along with the development of technologies, flash memory data storage device has gradually replaced the conventional magnetic data storage device to be used in personal computers due to its many characteristics, such as small volume, low power consumption and vibration-proofness.

Even though a flash memory data storage device is more advantageous than the conventional magnetic data storage device in many aspects, the unit erase number of a flash memory data storage device is lower than that of a magnetic data storage device. The lifespan of a flash memory data storage device will be shortened if a specific data storage area therein is repeatedly erased and written by a computer system or an application software.

SUMMARY

In one exemplary embodiment, the present disclosure provides a non-volatile data storage system including a first non-volatile storage medium, a second non-volatile storage medium, and a microprocessor. The first non-volatile storage medium includes a popular data address recording area for recording logic addresses of popular data in the first non-volatile storage medium. The microprocessor is coupled between the first non-volatile storage medium and the second non-volatile storage medium. When the non-volatile data storage system boots up, the microprocessor copies the popular data to the second non-volatile storage medium according to the popular data address recording area. Subsequently, the popular data is accessed only in the second non-volatile storage medium but not in the first non-volatile storage medium.

In another exemplary embodiment, the present disclosure provides a non-volatile data storage method. First, logic addresses of popular data in a first non-volatile storage medium are recorded. When a non-volatile data storage system boots up, the popular data is copied from the first non-volatile storage medium to a second non-volatile storage medium according to the recorded logic addresses. Subsequently, the popular data is accessed only in the second non-volatile storage medium but not in the first non-volatile storage medium.

BRIEF DESCRIPTION OF THE DRAWINGS

The accompanying drawings are included to provide a further understanding of the invention, and are incorporated in and constitute a part of this specification. The drawings illustrate disclosed embodiments of the invention and, together with the description, serve to explain the principles of the invention.

DETAILED DESCRIPTION

Figure 1:
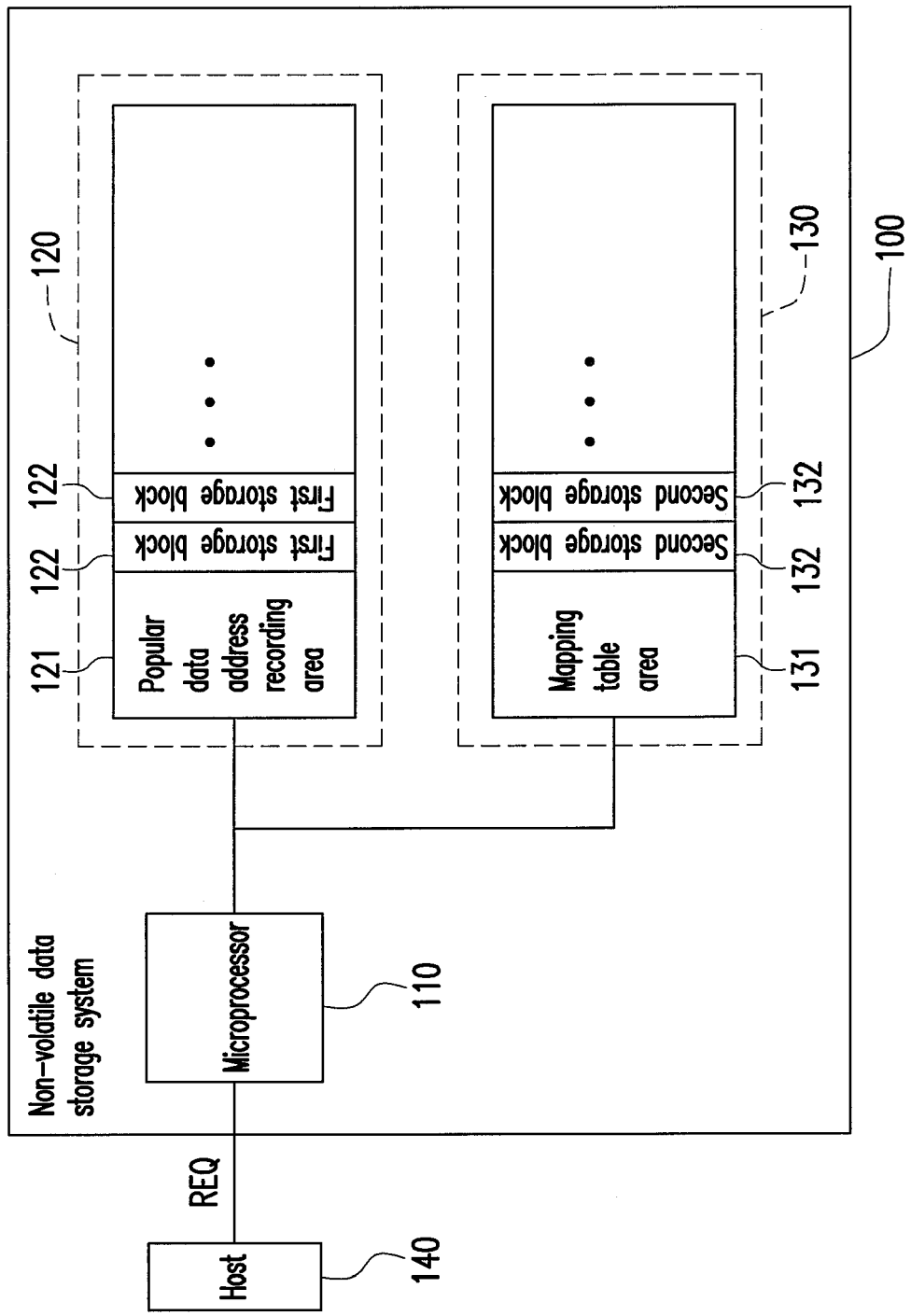
FIG. 1 is a block diagram of a non-volatile data storage system according to an exemplary embodiment.

Reference will now be made in detail to the present exemplary embodiments, examples of which are illustrated in the accompanying drawings. Wherever possible, the same reference numbers are used in the drawings and the description to refer to the same or like parts.

FIG. 1 is a block diagram of a non-volatile data storage system according to an exemplary embodiment. The non-volatile data storage system 100 includes a microprocessor 110, a first non-volatile storage medium 120, and a second non-volatile storage medium 130. The first non-volatile storage medium 120 includes a popular data address recording area 121 and a plurality of first storage blocks 122. The first storage blocks 122 are used for accessing data. The first storage blocks 122 have themselves' corresponding logic addresses. The popular data address recording area 121 is used for recording logic addresses of popular data in the first storage blocks 122. Herein popular data refer to the data which is frequently accessed by a host 140, such as various temporary files of an operating system or a file allocation table (FAT) of a file system. The popular data may be determined by the host 140 or some other programs. However, the method for determining the popular data is not to place restrictions on the present invention. Any conventional method for classifying popular and unpopular data may be used by the host 140 or the aforementioned programs.

The microprocessor 110 is coupled to the first non-volatile storage medium 120 and the second non-volatile storage medium 130. When the non-volatile data storage system 100 boots up, the microprocessor 110 copies the popular data from the first non-volatile storage medium 120 to the second non-volatile storage medium 130 according to the logic addresses recorded in the popular data address recording area 121. After the popular data is copied to the second non-volatile storage medium 130, even though the popular data exist in both the first non-volatile storage medium 120 and the second non-volatile storage medium 130, the popular data are accessed only in the second non-volatile storage medium 130 but not in the first non-volatile storage medium 120.

The second non-volatile storage medium 130 includes a mapping table area 131 and a plurality of second storage blocks 132. The second storage blocks 132 are used for accessing the popular data copied from the first non-volatile storage medium 120. The mapping table area 131 is used for mapping the logic addresses of the popular data in the second storage blocks 132 to the logic addresses of the popular data in the first storage blocks 122. It should be noted that the logic addresses of the non-volatile data storage system 100 are mapped to the logic addresses of the first storage blocks 122, while the logic addresses of the second storage blocks 132 are only mapped to the logic addresses of the popular data in the first storage blocks 122.

The erasing lifespan of the first non-volatile storage medium 120 is shorter than that of the second non-volatile storage medium 130. For example, the first non-volatile storage medium 120 may be a flash memory having shorter erasing lifespan, while the second non-volatile storage medium 130 may be a flash memory having longer erasing lifespan, a battery-powered random access memory (RAM), a magnetoresistive random access memory (MRAM), or a hard disk. However, the types of the first non-volatile storage medium 120 and the second non-volatile storage medium 130 are not to place restrictions on the present invention.

Because the popular data are accessed more frequently than the unpopular data, in the present embodiment, the popular data are copied from the short-lived first non-volatile storage medium 120 to the long-lived second non-volatile storage medium 130 to be accessed so that the erasing lifespan of the entire system can be prolonged with only a small quantity of second non-volatile storage medium 130. The less-accessed unpopular data can be directly accessed in the short-lived first non-volatile storage medium 120.

When the host 140 is about to access data, the host 140 sends a read/write request REQ to the microprocessor 110. Then, the microprocessor 110 determines whether there is change on the popular data according to the read/write request REQ; namely, the microprocessor 110 determines whether the original popular data are still the popular data and whether the original unpopular data are still the unpopular data. If there is change on the popular data (which may be that certain unpopular data become new popular data and the new popular data have a corresponding logic address in the first storage blocks 122), namely, if there is change on the logic addresses of the popular data, the microprocessor 110 updates the logic address corresponding to the new popular data in the popular data address recording area 121.

Figures 2, 3:
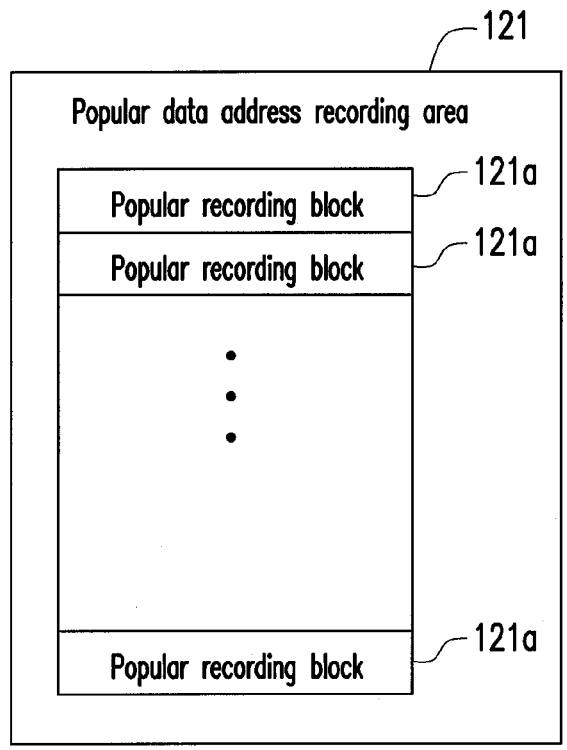
FIG. 2 is a diagram illustrating the data structure of a popular data address recording area in FIG. 1.
FIG. 3 is a diagram illustrating the data structure of a popular recording block in FIG. 2.

How to update the logic address corresponding to the new popular data in the popular data address recording area 121 will be explained with reference to FIG. 2. FIG. 2 is a diagram illustrating the data structure of the popular data address recording area 121 in FIG. 1. The popular data address recording area 121 has a plurality of popular recording blocks 121a. One of the popular recording blocks 121a is used for recording the logic addresses of the popular data in the first storage blocks 122. When there is change on the logic addresses of the popular data, namely, when the logic address corresponding to the new popular data is to be updated in the popular data address recording area 121, the microprocessor 110 erases the popular recording block 121a which originally stores the logic address of the popular data and records the changed logic address into the next popular recording block 121a among the popular recording blocks 121a. By using these popular recording blocks 121a alternatively, the lifespan of the popular data address recording area 121 can be prolonged.

FIG. 3 is a diagram illustrating the data structure of each popular recording block 121a in FIG. 2. Each of the popular recording blocks 121a has a plurality of start addresses and end addresses, wherein each set of start address and end address records the start point and end point of the logic address of each popular data in the first storage blocks 122.

When there is change on the popular data, it may be that the microprocessor 110 categorizes a first storage block 122 in the first non-volatile storage medium 120 which originally is not popular data as popular data. In this case, besides updating the popular data address recording area 121, the microprocessor 110 further copies the first storage block 122 which is categorized as popular data to the second non-volatile storage medium 130 so that the new popular data are accessed in the second non-volatile storage medium 130 instead of the first non-volatile storage medium 120. In addition, when there is change on the popular data, it may also be that the microprocessor 110 excludes a second storage block 132 in the second non-volatile storage medium 130 which is originally popular data from the popular data and accordingly this second storage block 132 becomes new unpopular data. In this case, the microprocessor 110 copies the second storage block 132 excluded from the popular data to the first non-volatile storage medium 120 so that subsequently, the new unpopular data are accessed in the first non-volatile storage medium 120.

Additionally, the host 140 can directly send the logic addresses of the popular data to the microprocessor 110. The microprocessor 110 then records the received logic addresses in the popular data address recording area 121. The microprocessor 110 further checks whether a logic address of the read/write request REQ received from the host 140 is recorded in the popular data address recording area 121. If the logic address of the read/write request REQ is recorded in the popular data address recording area 121, the microprocessor 110 executes the read/write request REQ in the second non-volatile storage medium 130. Otherwise, if the logic address of the read/write request REQ is not recorded in the popular data address recording area 121, the microprocessor 110 executes the read/write request REQ in the first non-volatile storage medium 120.

Figure 4:
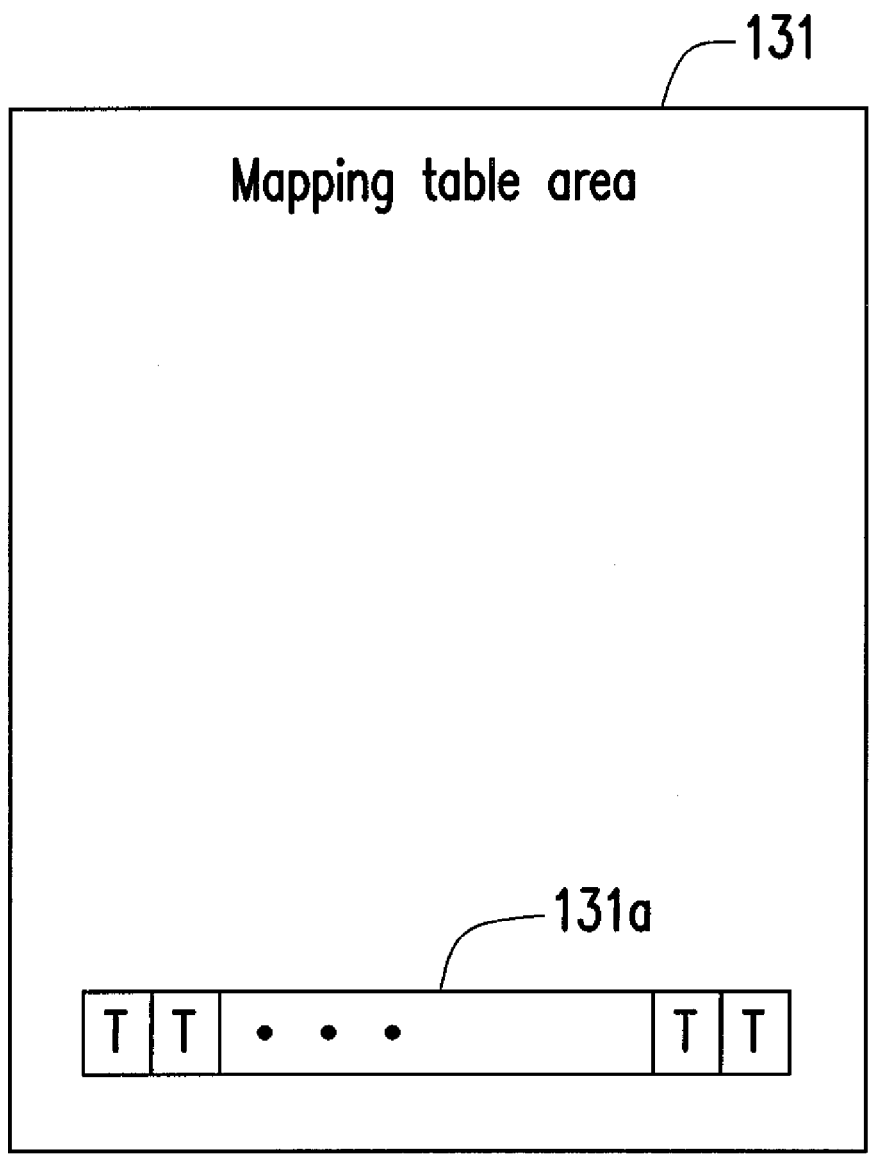
FIG. 4 is a diagram illustrating the data structure of a mapping table area according to an exemplary embodiment.

FIG. 4 is a diagram illustrating the data structure of the mapping table area 131 according to an exemplary embodiment. The mapping table area 131 includes a flag array 131a. The flag array 131a has a plurality of flags T corresponding to the second storage blocks 132 of the second non-volatile storage medium 130. The flags T indicate whether the popular data in the corresponding second storage blocks 132 are updated after the popular data are copied from the first non-volatile storage medium 120 to the second non-volatile storage medium 130.

Figure 5:
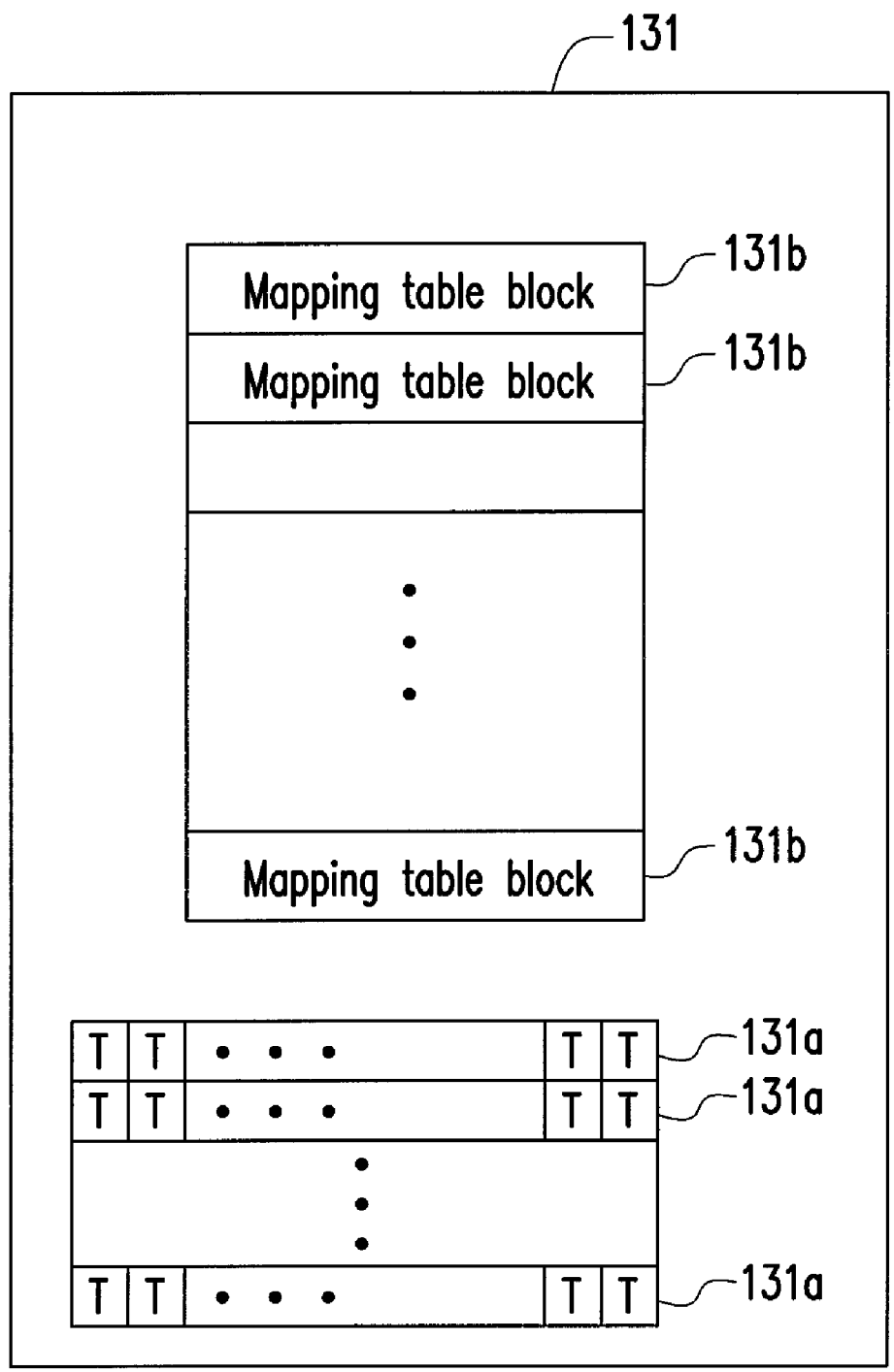
FIG. 5 is a diagram illustrating the data structure of another mapping table area according to an exemplary embodiment.

FIG. 5 is a diagram illustrating the data structure of another mapping table area 131 according to an exemplary embodiment. The mapping table area 131 includes a plurality of mapping table blocks 131b. One of the mapping table blocks 131b stores the flag array 131a. When popular data are updated in the second non-volatile storage medium 130, the flag array 131a is updated accordingly to set the flag corresponding to the popular data to an updated state. When the flag array 131a is updated, the microprocessor 110 erases the mapping table block 131b which originally stores the flag array 131a and writes the updated flag array 131a into the next mapping table block 131b among the mapping table blocks 131b. By using the mapping table blocks 131b alternatively, the lifespan of the mapping table area 131 can be prolonged.

Regardless of whether the mapping table area 131 in FIG. 4 or FIG. 5 is used, at a predetermined time, the microprocessor 110 copies the updated popular data from the second non-volatile storage medium 130 to the first non-volatile storage medium 120 according to the flag array 131a in the mapping table area 131. The predetermined time may be when the system boots up, when the system is powered off, when a power failure occurs, or may also be at predetermined intervals. After the updated popular data are copied to the first non-volatile storage medium 120, the microprocessor 110 sets the flags T corresponding to the updated popular data to a non-updated state, wherein the non-updated state of the flags T represents that data in the second non-volatile storage medium 130 are the same as the corresponding data in the first non-volatile storage medium 120.

When there is change on the popular data, it may be that the microprocessor 110 excludes one second storage block 132 in the second non-volatile storage medium 130 from the popular data so that the second storage block 132 becomes a new unpopular data. In this case, the microprocessor 110 copies the second storage block 132 excluded from the popular data to the first non-volatile storage medium 120. Subsequently, the new unpopular data are accessed in the first non-volatile storage medium 120, and the microprocessor 110 sets the flag T corresponding to this second storage block 132 to a non-updated state.

Figure 6:
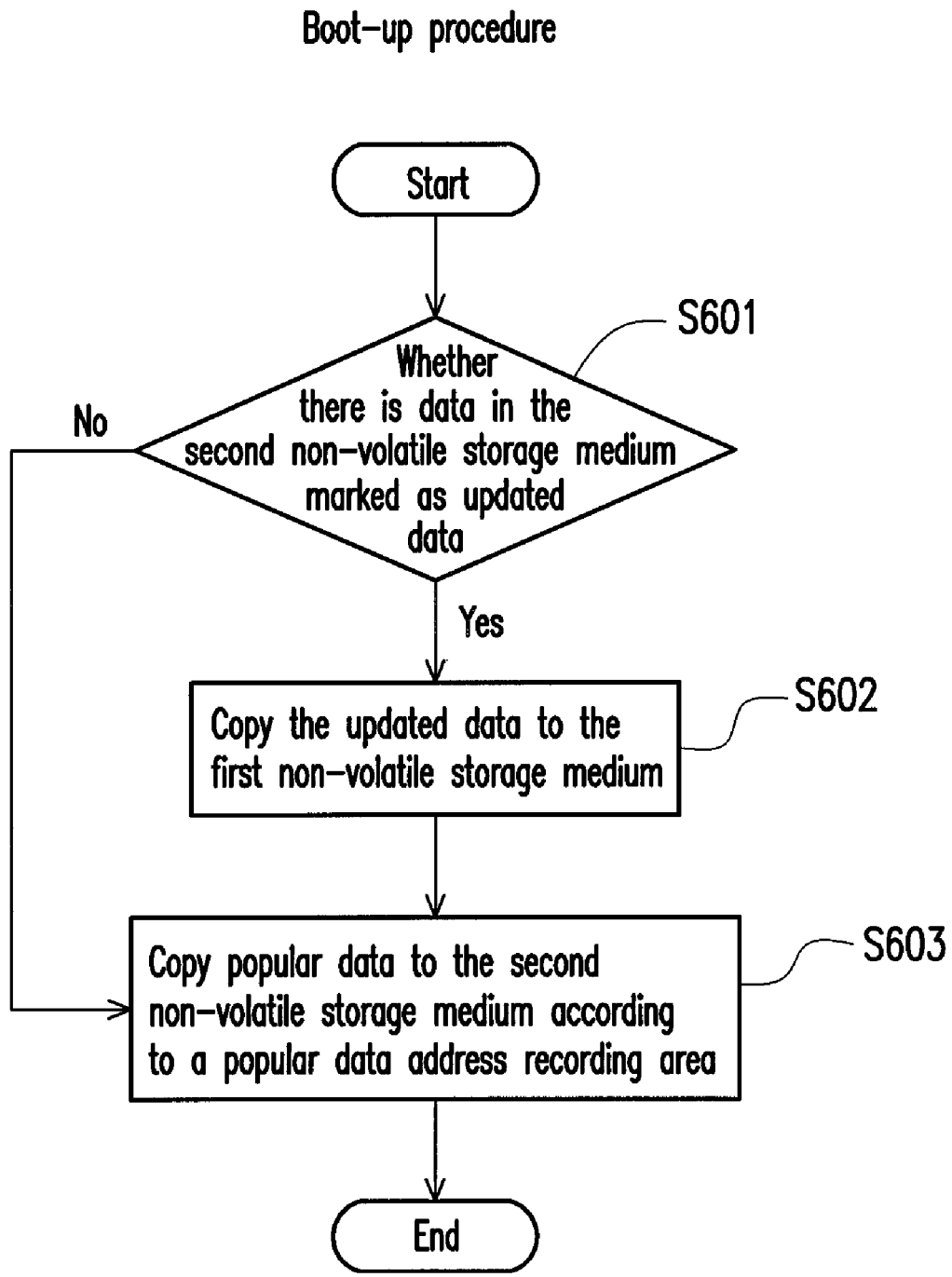
FIG. 6 is a flowchart of a method for booting up a non-volatile data storage system according to an exemplary embodiment.

FIG. 6 is a flowchart of a method for booting up the non-volatile data storage system 100. Referring to FIGS. 1~5, the process for booting up the non-volatile data storage system 100 includes following steps. In step S601, whether there are data in the second non-volatile storage medium 130 marked as updated data are checked. If there, are updated data in the second non-volatile storage medium 130, in step S602, the updated data are copied into the first non-volatile storage medium 120, and the corresponding flag is set to a non-updated state. If there are no updated data in the second non-volatile storage medium 130 or the updated data are already copied to the first non-volatile storage medium 120, in step S603, the popular data are copied to the second non-volatile storage medium 130 according to the recorded logic addresses of the popular data in the first non-volatile storage medium 120. The boot-up process ends here.

Figure 7:
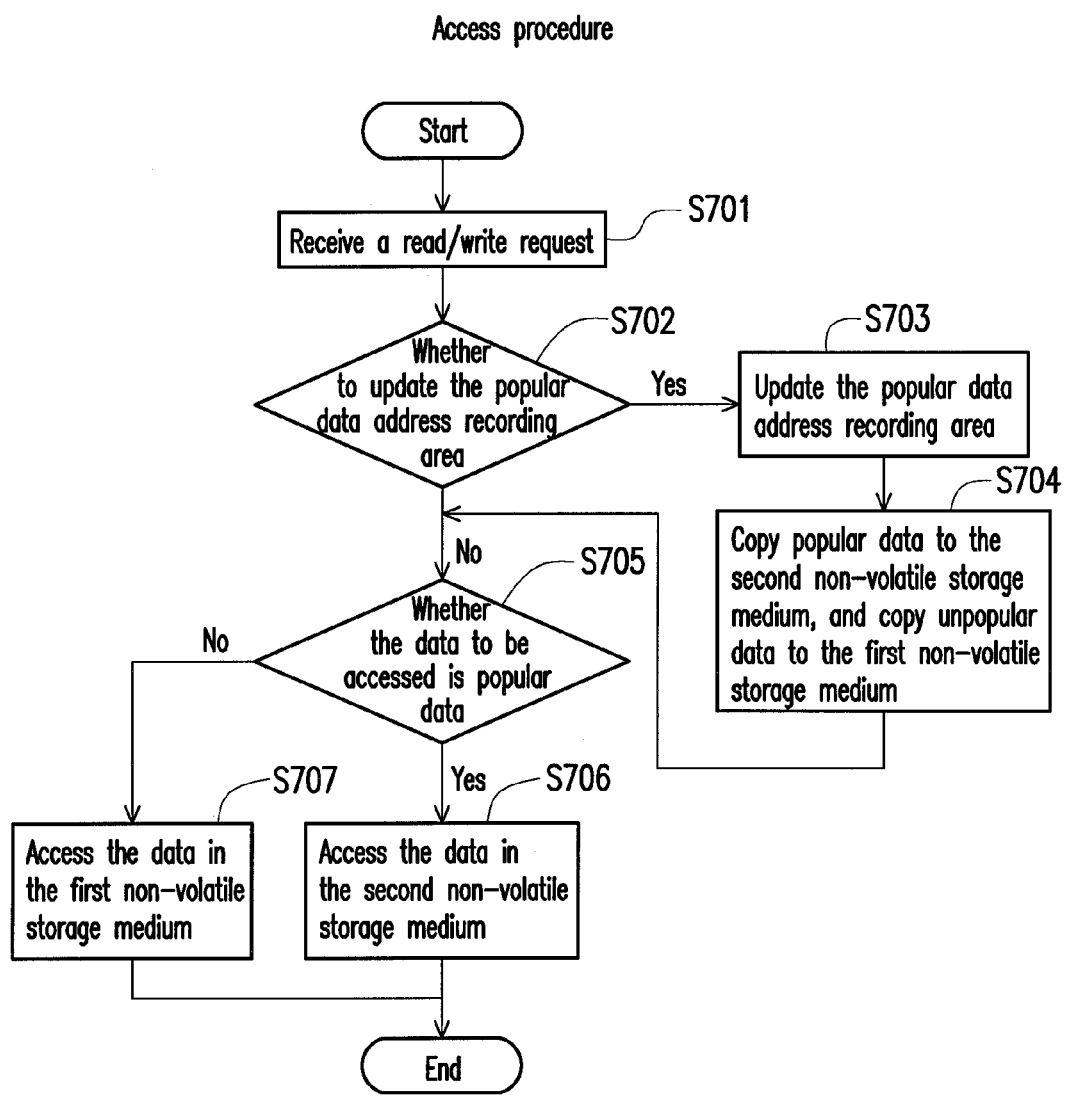
FIG. 7 is a flowchart of a method for accessing a non-volatile data storage system according to an exemplary embodiment.

FIG. 7 is a flowchart of a method for accessing the non-volatile data storage system 100. Referring to FIGS. 1~5, the process for accessing the non-volatile data storage system 100 includes steps S701~S707. In step S701, a read/write request REQ is received from the host 140. In step S702, whether there is change in the logic addresses of the popular data in the first non-volatile storage medium 120 and accordingly the popular data address recording area 121 is to be updated are determined according to the read/write request REQ. If the popular data address recording area 121 is to be updated, in step S703, the logic addresses recorded in the popular data address recording area 121 are updated. Then, in step S704, the second storage block 132 which is originally in the second non-volatile storage medium 130 but then excluded from the popular data are copied to the first non-volatile storage medium 120, and the first storage block 122 which is originally an unpopular data but then categorized as a popular data are copied to the second non-volatile storage medium 130 according to the updated popular data address recording area 121. After that, in step S705, whether the logic address of the read/write request REQ is recorded in the popular data address recording area 121 is determined. If the logic address of the read/write request REQ is recorded in the popular data address recording area 121, in step S706, the read/write request REQ is executed in the second non-volatile storage medium 130; otherwise, in step S707, the read/write request REQ is executed in the first non-volatile storage medium 120.

As described above, the non-volatile data storage system 100 records the logic addresses of the popular data in the popular data address recording area 121, and the microprocessor 110 copies the popular data to the long-lived second non-volatile storage medium 130 according to the popular data address recording area 121. At a predetermined time, the microprocessor 110 copies the updated popular data back to the short-lived first non-volatile storage medium 120. As a result, the number of erasing the popular data in the short-lived first non-volatile storage medium 120 is reduced.

It will be apparent to those skilled in the art that various modifications and variations can be made to the structure of the disclosed embodiment without departing from the scope or spirit of the invention. In view of the foregoing, it is intended that the embodiments described be considered as exemplary only, with the true scope of the embodiments being indicated by the following claims and their equivalents.

What is claimed is:

1. A non-volatile data storage system, comprising:
   a first non-volatile storage medium, comprising:
      a popular data address recording area, for recording a logic address of a popular data in the first non-volatile storage medium; and
   a second non-volatile storage medium; and
   a microprocessor, coupled to the first non-volatile storage medium and the second non-volatile storage medium, for copying the popular data from the first non-volatile storage medium to the second non-volatile storage medium according to the popular data address recording area when the non-volatile data storage system boots up,
   wherein the popular data are accessed only in the second non-volatile storage medium but not in the first non-volatile storage medium;
   wherein an erasing lifespan of the first non-volatile storage medium is shorter than an erasing lifespan of the second non-volatile storage medium.

2. The non-volatile data storage system according to claim 1, wherein the first non-volatile storage medium is a flash memory, and the second non-volatile storage medium is a flash memory, a battery-powered random access memory (RAM), a magnetoresistive random access memory (MRAM), or a hard disk.

3. The non-volatile data storage system according to claim 1, wherein the second non-volatile storage medium comprises a mapping table area, the mapping table area comprises a flag array, the flag array has a plurality of flags corresponding to a plurality of second storage blocks of the second non-volatile storage medium, and the flags indicate whether the popular data in the second storage blocks are updated after the popular data are copied to the second non-volatile storage medium.

4. The non-volatile data storage system according to claim 3, wherein the mapping table area comprises:
   a plurality of mapping table blocks, wherein the flag array is stored in one of the mapping table blocks, and when the flag array is updated, the microprocessor erases the mapping table block which originally stores the flag array and writes the updated flag array into the next mapping table block among the mapping table blocks.

5. The non-volatile data storage system according to claim 3, wherein the microprocessor further copies the updated popular data to the first non-volatile storage medium at a predetermined time according to the flag array, wherein the predetermined time comprises at least one of a boot-up time of the non-volatile data storage system, a power-off time of the non-volatile data storage system, a power failure time of the non-volatile data storage system, and a predetermined interval.

6. The non-volatile data storage system according to claim 5, wherein after copying the updated popular data to the first non-volatile storage medium according to the flag array, the microprocessor further sets the flags corresponding to the updated popular data to a non-updated state to indicate that data in the second non-volatile storage medium are the same as the corresponding data in the first non-volatile storage medium.

7. The non-volatile data storage system according to claim 1, wherein the microprocessor further receives a read/write request from a host, determines whether the logic address of the popular data changes according to the read/write request, and updates the popular data address recording area correspondingly if the logic address changes.

8. The non-volatile data storage system according to claim 7, wherein the popular data address recording area has a plurality of popular recording blocks, and when the logic address of the popular data changes, the microprocessor erases the popular recording block which originally stores the logic address and writes the changed logic address into the next popular recording block among the popular recording blocks.

9. The non-volatile data storage system according to claim 7, wherein if the microprocessor categorizes a first storage block of the first non-volatile storage medium into the popular data, the microprocessor copies the first storage block to the second non-volatile storage medium, and if the microprocessor excludes a second storage block of the second non-volatile storage medium from the popular data, the microprocessor copies the second storage block to the first non-volatile storage medium and sets a flag corresponding to the second storage block to a non-updated state.

10. The non-volatile data storage system according to claim 7, wherein the microprocessor further receives the logic address of the popular data from the host and records the logic address in the popular data address recording area.

11. The non-volatile data storage system according to claim 8, wherein the microprocessor further checks whether the popular data address recording area records a logic address of the read/write request, wherein the microprocessor executes the read/write request in the second non-volatile storage medium if the popular data address recording area records the logic address of the read/write request, and the microprocessor executes the read/write request in the first non-volatile storage medium if the popular data address recording area does not record the logic address of the read/write request.

12. A non-volatile data storage method, comprising:
recording a logic address of a popular data in a first non-volatile storage medium; and
copying the popular data from the first non-volatile storage medium to a second non-volatile storage medium according to the recorded logic address when a non-volatile data storage system boots up, wherein the popular data are accessed only in the second non-volatile storage medium but not in the first non-volatile storage medium;
wherein an erasing lifespan of the first non-volatile storage medium is shorter than an erasing lifespan of the second non-volatile storage medium.

13. The non-volatile data storage method according to claim 12, wherein the first non-volatile storage medium is a flash memory, and the second non-volatile storage medium is a flash memory, a battery-powered RAM, an MRAM, or a hard disk.

14. The non-volatile data storage method according to claim 12, further comprising:
indicating whether the popular data accessed in the second non-volatile storage medium is updated after the popular data are copied to the second non-volatile storage medium.

15. The non-volatile data storage method according to claim 14, wherein the second non-volatile storage medium comprises a mapping table area, the mapping table area has a plurality of mapping table blocks, one of the mapping table blocks stores a flag array for indicating whether the popular data accessed in the second non-volatile storage medium is updated, and the non-volatile data storage method further comprises:
erasing the mapping table block which originally stores the flag array and writing the flag array into the next mapping table block among the mapping table blocks when the flag array is updated.

16. The non-volatile data storage method according to claim 14, further comprising:
copying the updated popular data from the second non-volatile storage medium to the first non-volatile storage medium at a predetermined time, wherein the predetermined time comprises at least one of a boot-up time of the non-volatile data storage system, a power-off time of the non-volatile data storage system, a power failure time of the non-volatile data storage system, and a predetermined interval.

17. The non-volatile data storage method according to claim 16, further comprising:
setting the updated popular data to a non-updated state to indicate that data in the second non-volatile storage medium is the same as the corresponding data in the first non-volatile storage medium after copying the updated popular data from the second non-volatile storage medium to the first non-volatile storage medium.

18. The non-volatile data storage method according to claim 12, further comprising:
receiving a read/write request, determining whether the logic address of the popular data changes according to the read/write request, and correspondingly updating the recorded logic address of the popular data if the logic address changes.

19. The non-volatile data storage method according to claim 18, wherein the first non-volatile storage medium comprises a popular data address recording area, the popular data address recording area has a plurality of popular recording blocks, and the non-volatile data storage method further comprises:
erasing the popular recording block which originally stores the logic address and writing the logic address into the next popular recording block among the popular recording blocks when the logic address of the popular data changes.

20. The non-volatile data storage method according to claim 18, further comprising:
copying a first storage block of the first non-volatile storage medium to the second non-volatile storage medium if the first storage block is categorized into the popular data;
copying a second storage block of the second non-volatile storage medium to the first non-volatile storage medium and setting a flag corresponding to the second storage block to a non-updated state if the second storage block is excluded from the popular data.

21. The non-volatile data storage method according to claim 18, further comprising:
receiving the logic address of the popular data from a host, and recording the logic address of the popular data.

22. The non-volatile data storage method according to claim 18, further comprising:
checking whether the recorded logic address of the popular data comprises a logic address of the read/write request;

executing the read/write request in the second non-volatile storage medium if the recorded logic address of the popular data comprises the logic address of the read/write request, and executing the read/write request in the first non-volatile storage medium if the recorded logic address of the popular data does not comprise the logic address of the read/write request.

* * * * *